United States Patent
Baeuml et al.

(10) Patent No.: US 6,824,607 B2
(45) Date of Patent: Nov. 30, 2004

(54) CEMENT-BOUND ACTIVE SUBSTANCE

(76) Inventors: Martin Baeuml, Idastrasse 5, CH-8003, Zurich (CH); Giovanni Martinola, Schulstrasse 36, CH-8105, Regensdorf (CH)

( * ) Notice: Subject to any disclaimer, the term of this patent is extended or adjusted under 35 U.S.C. 154(b) by 0 days.

(21) Appl. No.: 10/296,835

(22) PCT Filed: May 25, 2001

(86) PCT No.: PCT/CH01/00325

§ 371 (c)(1), (2), (4) Date: Nov. 25, 2002

(87) PCT Pub. No.: WO01/90022

PCT Pub. Date: Nov. 29, 2001

(65) Prior Publication Data

US 2004/0089204 A1 May 13, 2004

(30) Foreign Application Priority Data

May 24, 2000 (CH) .............................................. 1037/00

(51) Int. Cl.[7] ........................ C04B 28/02; C04B 32/02; C04B 24/00; C04B 22/00
(52) U.S. Cl. ................... 106/802; 106/644; 106/672; 106/676; 106/677; 106/681; 106/719; 106/724; 106/727; 106/728; 106/803; 106/806; 106/808; 106/810; 106/823
(58) Field of Search ............................... 106/644, 672, 106/676, 677, 681, 719, 724, 727, 728, 802, 803, 806, 808, 810, 823

(56) References Cited

U.S. PATENT DOCUMENTS 3,458,327 A * 7/1969 Fraser ......................... 427/427
5,527,388 A * 6/1996 Berke et al. ................. 106/819
6,174,461 B1 * 1/2001 Miksic et al. ........... 252/389.32

FOREIGN PATENT DOCUMENTS

| DE | 004133894 A1 | * 10/1991 |
| DE | 019911135 A1 | * 3/1999 |
| JP | 49-107024 A1 | * 10/1974 |

* cited by examiner

Primary Examiner—Anthony J. Green
(74) Attorney, Agent, or Firm—Speckman Law Group PLLC; Janet Sleath

(57) ABSTRACT

The invention relates to a novel cement-bound material with a mineral binding agent, a mineral filler and/or mineral aggregates. Said cement-bound material has a proportion of a mass hydrophobing agent comprised of stearates, siliconates, silanes or siloxanes ranging from 0.5 to 20 wt. % with regard to the weight of the mineral binding agent. The cement-bound material also has a proportion of a corrosion inhibitor, which is capable of migrating and which is comprised of nitrites, benzoates, amio alcohols or of sodium monofluorophosphates ranging from 01. to 20 kg per m3 of the active substance, and/or has a proportion of flexible fibers.

18 Claims, 3 Drawing Sheets

CEMENT-BOUND ACTIVE SUBSTANCE

CROSS-REFERENCE TO RELATED APPLICATIONS

This application is a national phase filing of PCT International Application No. PCT/CH01/00325, filed May 25, 2001, which claims priority to Swiss Patent Application No. 1037/00, filed May 24, 2000.

FIELD OF THE INVENTION

The present invention relates to a cement-bound material.

BACKGROUND OF THE INVENTION

Various examples show that the durability of reinforced concrete structures is substantially lower than was assumed during their planning. For this reason up to half the national expenditure in the field of construction goes in industrial countries towards the repair of existing buildings. Even such repair measures often do not show the desired durability. This is due to the fact that efficient materials and material systems are still missing which give the desired durability both to new buildings as well as the repair of existing buildings.

The occurring damage is mainly based on the following mechanisms:

1. Cement-bound materials are brittle and are subjected to differential shrinkage deformations after their production. These two phenomena lead to a complex inherent tension state and to the formation of cracks on the surface of the building component. These cracks facilitate the access of substances which lead both to the destruction of the concrete (sulfate) as well as to corrosion of the armoring (chlorides from anti-freeze salts). The corrosion products comprise a volume which is up to three times larger, leading to the chipping off of the concrete and to the exposure of the steel armoring.

2. Cement-bound materials are porous systems which absorb damaging substances (sulfates, chlorides, acids) into the pore system at their surface by capillary suction, diffusion and permeation.

3. Conventional cement-bound materials (primarily concrete) need to be compacted after their introduction into a shuttering by means of vibration machines in order to achieve a homogeneous structure. This work process is often not performed with the required diligence, leading to the consequence that the concrete is inhomogeneous and the absorption of damaging substances is strongly increased locally.

There are measures and products that are capable of preventing or ameliorating certain of the above damage mechanisms. For example, it is known from EP-A-0 286 112 to add synthetic fibers as a reinforcement for cement mortar or concrete, which fibers consist of monofilaments with a tensile strength of a maximum of 80 kg/mm$^2$. From U.S. Pat. No. 4,261,754 a reinforcing fiber element is known which consists of oriented polyolefins in order to reinforce a matrix material such as cement. The fibers have a varying cross section in the longitudinal direction and roughened surfaces from which fibrils project. In U.S. Pat. No. 4,483,727 a method for producing bundles made of polyethylene fibers is described which is used for reinforcing brittle material such as cement, concrete plaster of Paris or the like. From U.S. Pat. No. 4,968,561 a synthetic monofilament made of polyvinyl alcohol is known which is used as a reinforcement for cement mortar or concrete. U.S. Pat. No. 5,399,195 describes a method for producing a cement material which reduces self-induced cracking. For this purpose synthetic fiber bundles are added, which bundles consist of 10 to 10,000 filaments per bundle. The filaments substantially consist of polyolefins, polyolefin derivatives and a polyester. Moreover, so-called corrosion inhibitors are known from U.S. Pat. No. 6,071,436 and U.S. Pat. No. 6,174,461. So-called waterproofing agents are known from U.S. Pat. Nos. 5,531,812 and 6,139,622 which make the surfaces of the concrete water-repellent. For this purpose aqueous solutions made of alkoxyl silanes, organic silanes and organic siloxane resins are used.

There are no efficient concepts for material systems which are capable of preventing all damaging mechanisms and their causes to such an extent that the durability can be increased several times over as compared with currently used methods.

SUMMARY OF THE INVENTION

The present invention is now based on the object of providing a cement-bound material which shows a considerably higher durability and is especially suitable for repairing existing buildings.

This object is achieved by a cement-bound material having a mineral binding agent, the cement-bound material comprising a mass hydrophobing agent selected from the group consisting of stearates, siliconates, silanes and siloxanes ranging from 0.5 to 20 wt. % with regard to the weight of the mineral binding agent, and a corrosion inhibitor which is capable of migrating and which is selected from the group consisting of nitrites, benzoates, amino alcohols and sodium monofluorophospahtes ranging from 0.1 to 20 kg per m$^3$ of the material. In another embodiment, a cement-bound material having a mineral binding agent is provided, wherein the cement-bound material comprises a mass hydrophobing agent selected from the group consisting of stearates, siliconates, silanes and siloxanes ranging from 0.5 to 20 wt. % with regard to the weight of the mineral binding agent, and flexible fibers with a height-width ratio of 10 to 1000, preferably 200 to 600, a tensile strength of 0.8 to 4.0 GPa and a modulus of elasticity of 20 to 230 GPa, preferably higher than 25 GPa, wherein the fibers are present in an amount of 0.1 to 4.0% preferably 0.5 to 3.0%, by total volume.

The material in accordance with the invention comes with the major advantage that as a result of mass hydrophobing the penetration of contaminant-containing water is prevented and thus the durability of repairs is increased considerably. The armoring steel is retroactively protected against corrosion by adding migration-capable corrosion inhibitors.

BRIEF DESCRIPTION OF THE DRAWINGS

Further advantages of the invention follow from the description below in which the invention is explained in closer detail by reference to an embodiment shown in the drawings, wherein.

DETAILED DESCRIPTION OF THE INVENTION

As is generally known, concrete is made of a mineral binding agent such as natural unslaked lime, pozzolan, natural or Portland cement, one or several mineral fillers such as powdered mineral, flue dust and microsilicates, and/or of mineral aggregates such as sand or gravel. Water and cement is mixed at a ratio of 1:2 and thereafter the mineral fillers and/or the mineral aggregates are added at a certain ratio. The maximum elastic strain of said normal concrete under tensile load is at approx. 0.01%. The cement-bound materials of the system as described herein consist of the known concrete mixtures with an additional proportion of a mass hydrophobing agent comprised of stearates, siliconates, silanes or siloxanes of between 0.5 and 20 wt. % with regard to the weight of the mineral binding agent or cement and with an additional proportion of a corrosion inhibitor which is capable of migrating and which is comprised of nitrites, benzoates, amino alcohols or of sodium monofluorophosphates ranging from 0.1 to 20 kg per $m^3$ of the material. In addition it is possible to add flexible metallic fibers made of steel and/or non-metallic fibers made of polyolefins such as highly crystalline polyethylene, polyvinyl alcohol or aramide, with a height-width ratio of 10 to 1000, preferably 200 to 600, a tensile strength of 0.8 to 4.0 GPa and a modulus of elasticity of 20 to 230 GPa, preferably higher than 25 GPa, with a share of 0.1 to 4.0 vol. %, preferably 0.5 to 3.0 vol. %, relating to the total volume. Moreover, lightweight aggregates such as styrofoam balls, micro hollow balls, cellular glass, swelling clay and the like can be added. Optionally, it is also possible to add further additives such as high-performance liquefiers, shrinkage reduction agents, shrinkage compensation agents, stabilizers, air-entraining agents, retarding admixtures, hardening accelerators, defrothing agents, etc.

Figure 1:
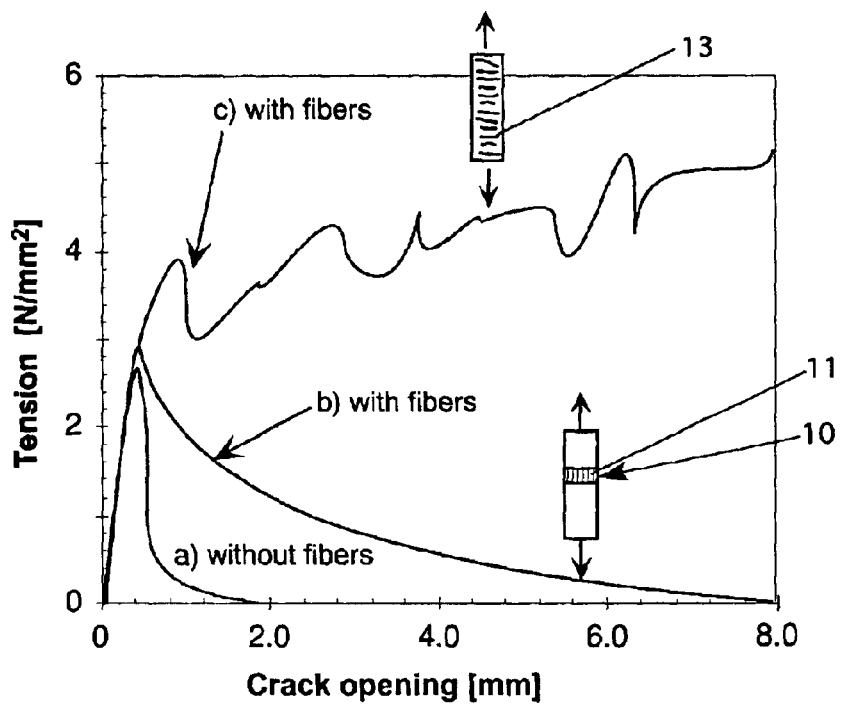
FIG. 1 shows the opening of a crack under tensile load.

FIG. 1 shows crack opening under deformation-controlled tensile load in various compositions of cement-bound material. Line 1a shows crack opening in concrete without fiber reinforcement: at a tension of approx. 3 N/mm² the material is locally weakened to such an extent that elongation weakening occurs and the cement-bound material breaks apart at a crack opening of approx. 2 mm. Line 1b shows the crack opening in a fiber-reinforced cement-bound material as is known from the state of the art as described above. A large crack 10 is bridged here by fibers 11, so that a higher elongation capacity is achieved. In this case the strength decreases approximately linearly. Line 1c shows the crack opening in a cement-bound material according to the present invention, with very small or so-called microcracks 13 being produced. For this purpose, variable amounts of flexible metallic and/or non-metallic fibers made of steel or polyolefins (highly crystalline polyethylene, polyvinyl alcohol, aramide) are added. The fiber volume amount lies between 0.1 and 4.0%, preferably 0.5 to 3.0%, relating to the total volume, with a height-width ratio of 10 to 1000, preferably 200 to 600, a tensile strength of 0.8 to 4.0 GPa and a modulus of elasticity of 20 to 230 GPa, preferably higher than 25 Gpa. It has been noticed that at an amount of 0.1 to approx. 0.7 vol. % the behavior according to Line 1b is still just about obtained. At an amount of approx. 0.7 vol. % to 3.0 vol. % the behavior according to Line 1c is obtained, however.

Figure 2:
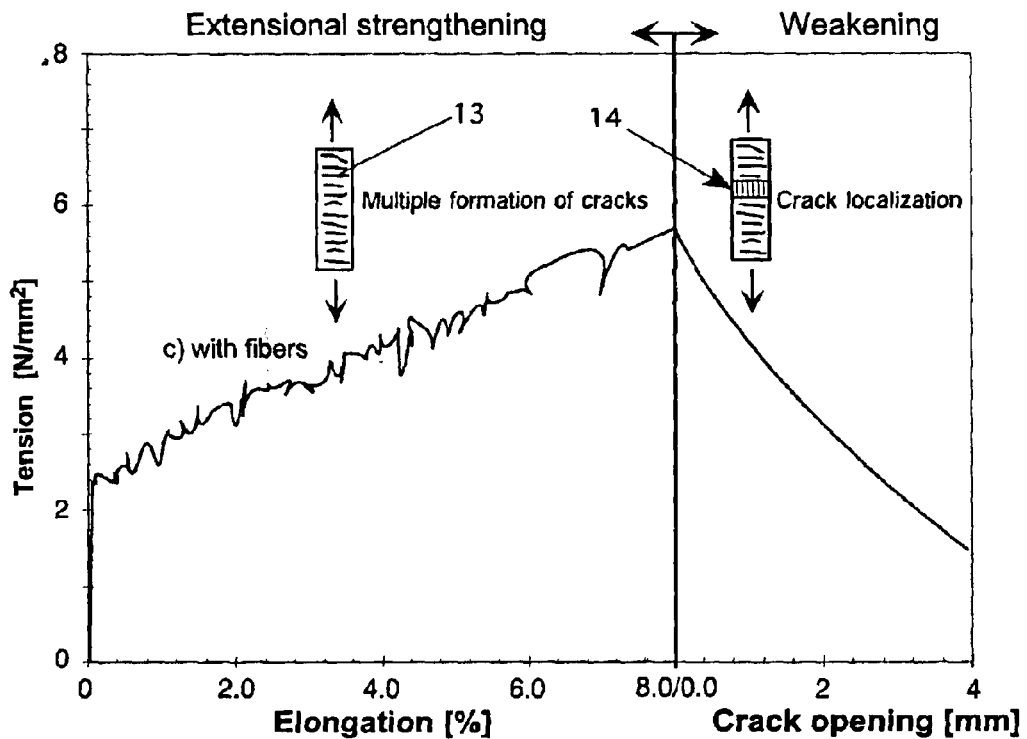
FIG. 2 illustrates extensional strengthening in comparison with crack opening.

FIG. 2 shows the elongation strengthening of the cement-bound material with microcracks. At a maximum elongation of approx. 8% the weakening commences, as a result of which larger cracks 14 are formed and the tension decreases in an approximately linear fashion in the concrete.

Figure 3A:
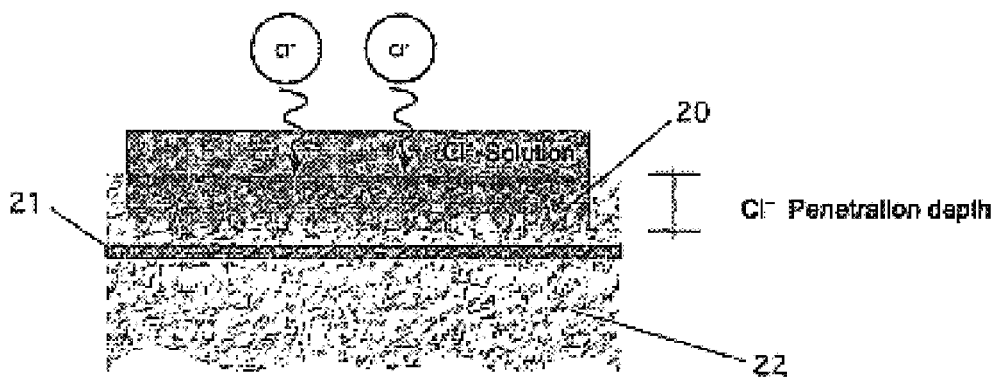
FIG. 3 illustrates mass hydrophobing.
Figure 3B:
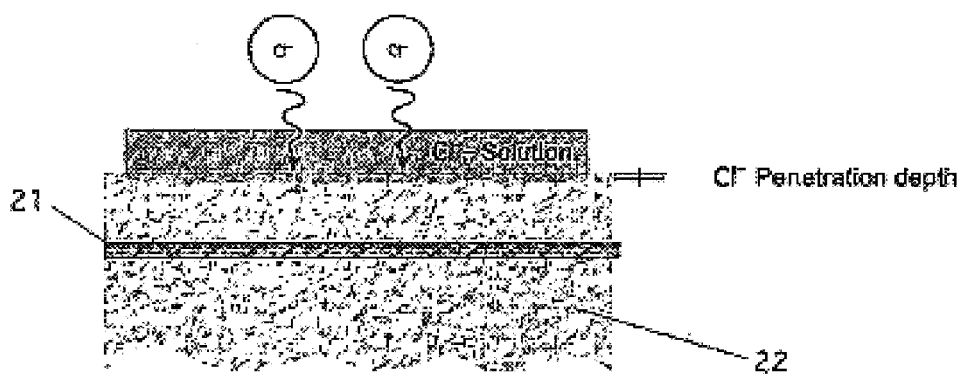
Figure 4:
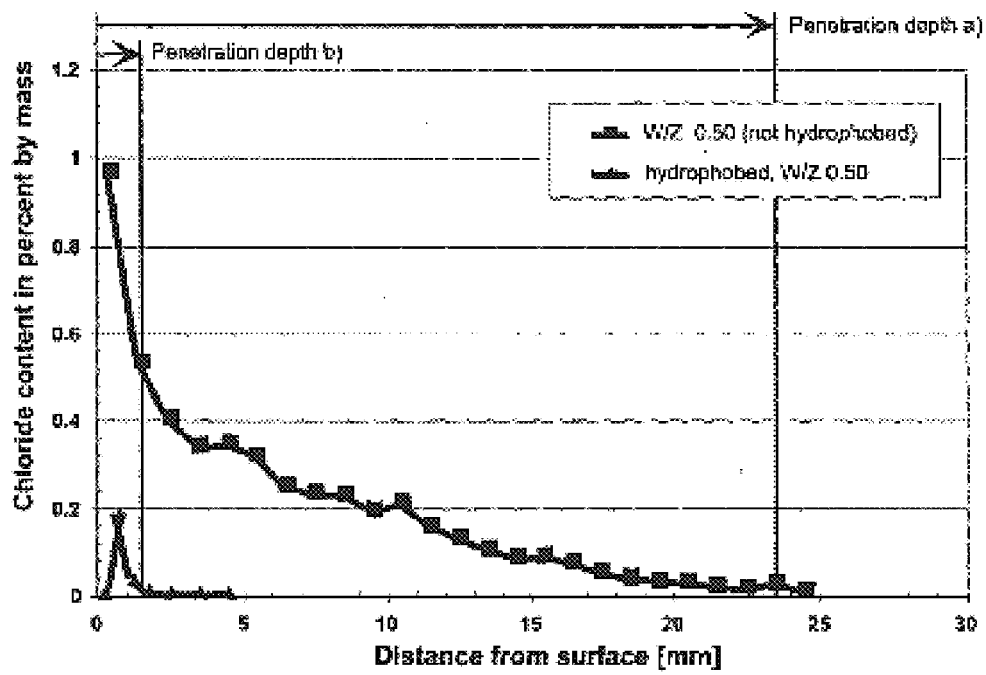
FIG. 4 shows the penetration depth of chlorides.

FIG. 3 shows the penetration depth of chlorides in a concrete without mass hydrophobing (FIG. 3a) and with mass hydrophobing (FIG. 3b). The contaminated zone 20 can clearly be seen, which reaches up to the armoring steel 21. The concrete component 22 which is situated below the armoring steel 21 is not further contaminated. When concrete has now been applied with mass hydrophobing agents, the penetration depth of the chlorides is approximately zero, meaning that it is a few millimeters at most. The respective diagram in FIG. 4 shows the measured penetration depth for the two materials. The measurements were performed after a surface contact during a period of 180 days with a 3% Cl⁻ solution. W/Z designates the ratio of water to cement, which has been inserted here as a standard of 1:2 for the measurements.

Figure 5:
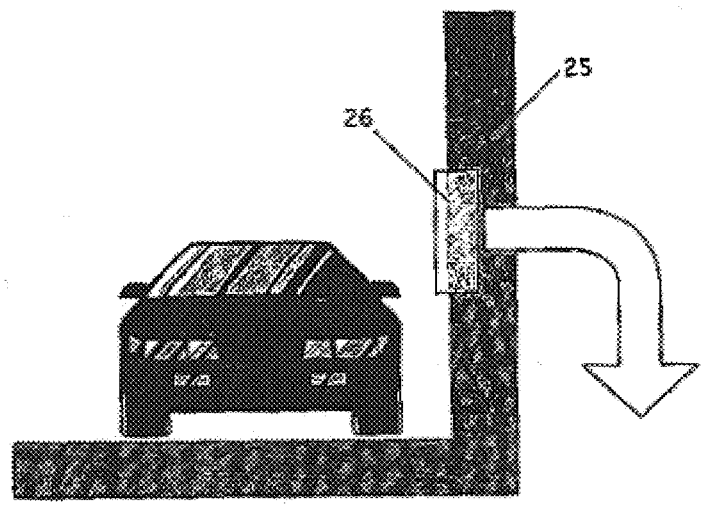
FIG. 5 shows a schematic tunnel cross section.

FIG. 5 schematically shows a tunnel cross section 25 with a damaged region 26. The following steps of FIGS. 6a through 6c are necessary for repairing this region.

For this purpose the cracked, contaminated covering concrete 26 is removed up to the corroding armoring steel 21 (FIGS. 6a and 6b). Usually, the concrete component 22 which is situated underneath is not contaminated. Subsequently, the new, mass-hydrophobed cement-bound material 27 is applied which in addition comprises corrosion inhibitors 28 which are capable of migration, and which migrate through the concrete to the armoring steel 21 and protect the same from further corrosion.

The components of the new cement-bound material have the following effect on the damage mechanisms:

The effect of the fibers is on the one hand that they distribute the deformations occurring by the shrinkage in such a way over the entire surface that no cracks occur or only cracks that are opened so slightly that they do not cause any endangerment due to the absorption of harmful substances. On the other hand, it is possible to entirely omit the conventional steel armoring for certain applications as housing construction, which leads to the complete avoidance of damage by corrosion. The behavior of the present cement-bound material is caused by the fact that the fibers bridge the microcracks caused by strain, prevent their further opening and transmit the mechanical strain to adjacent zones where also microcracks are produced, etc. As a result, only very small cracks are produced in the cement-bound material. As a result of this phenomenon of the so-called multiple crack formation, the load-carrying and deformation capability is increased considerably as compared with cement-bound materials without fibers.

Mass hydrophobing agents are substances such as stearates, siliconates, silanes or siloxanes which are added to the cement-bound material during its production and reduce the wetting angle of contact of the capillary pores of the hardened material to [such] a high extent. In this way, the absorption of liquids (primarily contaminant-containing water) is reduced to such a high extent that the effects of the aforementioned damage mechanisms are prevented or at least strongly ameliorated (cf. FIGS. 3 and 4). The proportion in weight of mass hydrophobing agent is between 0.5 and 20 wt. % relative to the weight of the mineral binding agent Mass hydrophobing agents are substances such as stearates, siliconates, silanes or siloxanes which are added to the cement-bound material during its production and reduce the wetting angle of contact of the capillary pores of the hardened material to [such] a high extent. In this way, the absorption of liquids (primarily contaminant-containing water) is reduced to such a high extent that the effects of the aforementioned damage mechanisms are prevented or at least strongly ameliorated (cf. FIGS. 3 and 4). The proportion in weight of mass hydrophobing agent is between 0.5 and 20 wt. % relative to the weight of the mineral binding agent Corrosion inhibitors are substances such as nitrites, benzoates, amino alcohols or sodium monofluorophosphates whose bipolar molecules lead to a passivation of the steel and thus to a protection from corrosion when deposited on the armoring steel or on steel fibers (inhibition of cathodic or anodic partial reaction). The amount in weight is 0.1 to 20 kg per $m^3$ of the cement-bound material (see FIG. 6).

High-performance plasticizers are substances such as polycarboxylates, melamines or naphthalene sulphonates and are added on the one hand in order to reduce the water demand of the cement-bound material, leading to a lower porosity and lower shrinkage deformations, which then leads to longer durability. On the other hand, they lead to self-compacting capabilities of the cement-bound material when added in sufficient quantities and under predetermined conditions. The self-compacting capability leads to the avoidance of structural inhomogeneities due to improperly performed external compaction by means of vibration equipment. The result is a highly homogeneous material. The content of high-performance plasticizer is between 0.1 and 3% relative to the binding agent mass. This means that vibration compacting can be omitted.

The variation of the components of the material allows setting the consistency in such a way that it can be applied in many different ways, namely either mechanically or manually with the wet or dry spraying method, by hand, provided with a shuttering, vibrated or self-compacting, or on location at the construction site or in the production of assembly units (extruded).

Applications

The static loads are low in housing construction. Concrete structures that are armored with armoring steel can accordingly be replaced by fiber-reinforced cement-bound materials according to the above explanation. Moreover, the consistency of the used material can be set to be self-compacting. As a result, the laying of steel armoring as well as compacting by means of vibration equipment can be omitted.

When repairing the walls of a drift mining tunnel, the concrete cover is removed up to the first corroded layer of armoring. A mass-hydrophobed cement-bound material is used for reproducing the surface, which substance is provided with a fiber reinforcement and contains a corrosion inhibitor which is capable of migration. Due to the fiber armoring the formation of cracks on the surface of the new layer is prevented. The corrosion inhibitors migrate into the existing base and protect or re-passivate the steel armoring there from new or further corrosion. The mass hydrophobing prevents the penetration of contaminant-containing water. The durability of this repair is higher by several times than that of the original structure or that of any other repair measure (cf. FIG. 4).

In drift mining, jetcrete is frequently used for lining the tunnel cross section that has broken out. Frequently, it is equipped at first with steel armoring nets or steel fiber concrete is used. An alternative is using a mass-hydrophobed and fiber-reinforced cement-bound material. The mass hydrophobing prevents the penetration of aggressive (e.g. sulfate-containing) mountain water. The fibers assume statical functions. This prevents any likelihood of steel corrosion and the concrete is protected from damaging substances.

Figure 6:
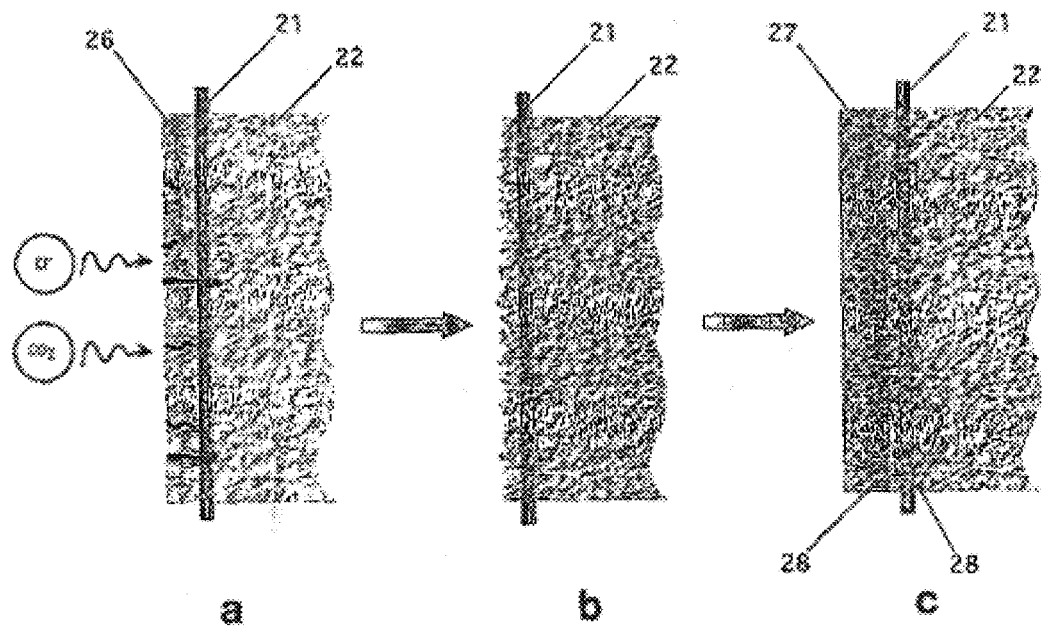
FIG. 6 shows three steps for repairing damaged concrete.

In certain applications, e.g. when conducting repairs according to FIG. 6 where after the removal of the damaged old concrete not only one but two layers of a new material are applied, it is possible to omit the fibers in the new material for the first, lower layer and to provide in addition only the mass hydrophobing and the corrosion inhibitor, since only the first upper layer is subjected to desiccation and thus to the risk of crack formation. In the new material of said second, upper layer on the other hand, it is possible to omit the corrosion inhibitors and to provide additionally only the fibers and a mass hydrophobing agent.

What is claimed is:

1. A cement-bound material having a mineral binding agent and at least one of mineral filler and mineral aggregates, the material comprising:
   a) a mass hydrophobing agent selected from the group consisting of: stearates; siliconates; silanes; and siloxanes, wherein the mass hydrophobing agent is present in an amount ranging from 0.5 to 20% by weight with regard to the weight of the mineral binding agent;
   b) a corrosion inhibitor which is capable of migrating and which is selected from the group consisting of: nitrites; benzoates; amino alcohols; and sodium monofluorophosphates, wherein the corrosion inhibitor is present in an amount ranging from 0.1 to 20 kg per $m^3$ of the cement-bound material; and
   c) flexible fibers with a height-width ratio of 10 to 1000, a tensile strength of 0.8 to 4.0 GPa and a modulus of elasticity of 20 to 230 GPa, wherein the fibers are present in an amount of 0.1 to 4.0% by total volume.

2. The cement-bound material, of claim 1, wherein the fibers have a height-width ratio of 200 to 600.

3. The cement-bound material of claim 1, wherein the fibers have a modulus of elasticity higher than 25 GPa.

4. The cement-bound material of claim 1, wherein the fibers are present in an amount of 0.5 to 3.0% by total volume.

5. The cement-bound material of claim 1, wherein the fibers are formed from at least one component selected from the group consisting of: steel; and polyolefins.

6. The cement-bound material of claim 1, wherein the fibers are formed from at least one component selected from the group consisting of: steel; crystalline polyethylene; polyvinyl alcohols; and aramides.

7. The cement-bound material of claim 1, further comprising at least one lightweight aggregate.

8. The cement-bound material of claim 7, wherein the lightweight aggregate is selected from the group consisting of: Styrofoam balls; micro hollow balls; cellular glass; and swelling clay.

9. The cement-bound material of claim 1, further comprising an additive selected from the group consisting of: high-performance liquefiers; shrinkage reduction agents; shrinkage compensation agents; stabilizers; and air-entraining agents.

10. A cement-bound material with at least one of a mineral binding agent, a mineral filler and mineral aggregates, comprising:
   a) a mass hydrophobing agent selected from the group consisting of: stearates, siliconates, silanes and siloxanes, wherein the mass hydrophobing agent is present in an amount ranging from 0.5 to 20% by weight with regard to the weight of the mineral binding agent; and b) flexible fibers with a height-width ratio of 10 to 1000, a tensile strength of 0.8 to 4.0 GPa and a modulus of elasticity of 20 to 230 GPa, wherein the fibers are present in an amount of 0.1 to 4.0% by total volume.

11. The cement-bound material of claim 10, wherein the fibers have a height-width ratio of 200 to 600.

12. The cement-bound material of claim 10, wherein the fibers have a modulus of elasticity higher than 25 GPa.

13. The cement-bound material of claim 10, wherein the fibers are present in amount of 0.5 to 3.0% by total volume.

14. The cement-bound material of claim 10, wherein the fibers are formed from at least one component selected from the group consisting of: steel; and polyolefins.

15. The cement-bound material of claim 10, wherein the fibers are formed from at least one component selected from the group consisting of: steel; crystalline polyethylene; polyvinyl alcohol; and aramide.

16. The cement-bound material of claim 10, further comprising at least one lightweight aggregate.

17. The cement-bound material of claim 16, wherein the lightweight aggregate is selected from the group consisting of: Styrofoam balls; micro hollow balls; cellular glass; and swelling clay.

18. The cement-bound material of claim 10, further comprising an additive selected from the group consisting of: high-performance liquefiers; shrinkage reduction agents; shrinkage compensation agents; stabilizers; and air-entraining agents.

* * * * *